United States Patent [19]
Smith et al.

[11] Patent Number: 4,742,407
[45] Date of Patent: May 3, 1988

[54] TAPE THREADING DEVICE

[75] Inventors: David E. Smith, Lafayette; Dennis R. Olmsted; Joseph A. Fryberger, both of Longmont, all of Colo.

[73] Assignee: Aspen Peripherals, Longmont, Colo.

[21] Appl. No.: 872,931

[22] Filed: Jun. 11, 1986

[51] Int. Cl.$^4$ .............................................. G11B 15/67
[52] U.S. Cl. ........................................ 360/95; 226/92; 242/195
[58] Field of Search ............................ 360/95; 226/92; 242/195

[56] References Cited
U.S. PATENT DOCUMENTS

| | | | |
|---|---|---|---|
| 4,350,309 | 9/1982 | Richard et al. | 242/68.3 |
| 4,383,660 | 5/1983 | Richard et al. | 242/197 |
| 4,399,368 | 8/1983 | Rueger | 226/92 |
| 4,608,614 | 8/1986 | Rinkleib et al. | 360/95 |

*Primary Examiner*—Robert S. Tupper
*Attorney, Agent, or Firm*—Dorr, Carson, Sloan & Peterson

[57] ABSTRACT

An automatic tape threading device transfers a tape leader and its associated tape from a supply reel, past a transducer head, to a take-up reel. It is comprised of a threader arm having a perpendicular threader pin which follows an arcuate path defined by an overhead cam. The overhead cam guides the threader pin from a first predetermined position, which relates to a leader block associated with the supply reel, to a second predetermined position, which relates to a receiver mechanism within the take-up reel.

6 Claims, 6 Drawing Sheets

TAPE THREADING DEVICE

BACKGROUND OF THE INVENTION (1) Field of the Invention

This invention generally relates to tape threading devices, especially those used in tape drive systems. More particularly this invention is concerned with automatically threading leader block mounted tapes from their supply reels, past transducer heads, and on to take-up reels. Perhaps the most common transducer heads associated with this art are the magnetic read/write heads used to transfer information to and from magnetic tapes. Magnetic tapes of this kind are usually utilized in conjunction with tape cassette mechanisms.

(2) Description of the Prior Art

Various devices have been developed for automatically threading tapes from supply reels to take-up reels. In the case of magnetic tapes, such devices generally function best when the leading edge of the tape is provided with a leader block. One widely used leader block is described in U.S. Pat. No. 4,383,660 ("the -660 patent") and the teachings of this patent are hereby incorporated into this patent disclosure. The rear portions of such leader blocks are provided with tape gripping means such as pin and groove arrangements which serve to connect the leading edge of the tape to the leader block. The forward portions of these leader blocks are usually provided with a cylindrical slot for receiving a mating cylindrical threader pin suspended from the underside of a threader arm. Typically the cylindrical threader pin consists of a shaft which terminates in an enlarged member which engages with a similarly enlarged opening in the leader block. Typically these enlarged members are given a cylinder configuration. Consequently, an enlarged member having a cylinder configuration will engage with a like-contoured cylindrical slot in a leader block. Generally, the threader pin's enlarged member and the leader block's slot are designed to engage when the leader block's slot is moved downward to encompass the threader pin's enlarged base, for example in the manner shown in FIG. 5B of the -660 patent. The leader block's slot can be moved directly downward, i.e., parallel to the threader pin, or with a rotating downward motion such as that disclosed in U.S. patent application Ser. No. 872,951 whose teachings are hereby incorporated into this patent disclosure.

Most prior art magnetic tape threading devices employ rather complex pantoarm mechanisms to thread leader blocks from tape supply reels to take-up reels. One representative and widely used pantoarm assembly is disclosed in U.S. Pat. No. 4,399,936 ("the -936 patent"). Its most prominent feature is a powered, rotatable, pantoarm assembly which is mounted over a cam substrate. The cam substrate has an irregular, but generally elliptical-shaped cam groove. This cam groove, in cooperation with the pantoarm assembly, serves to define a complex, circumvoluted path over which the tape leader travels from the tape deck's supply reel to its take-up reel.

Its mechanism is rather complex. The first pantoarm element is a shaft linkage arm fixedly connected to a motor. A follower linkage is pivotally connected to its other end. The opposite end of the follower linkage cooperates with a tape leader of the type disclosed in the -660 patent. This follower linkage is also pivotally connected to a cam linkage. The opposite end of the cam linkage, in turn, is pivotally connected to a bearing which follows the contour of the cam groove. The shaft linkage and cam linkage are also interconnected by means of a linkage arm having pivot connections on each of its ends. In all, this particular pantoarm assembly has four linkage arms and five pivot connections.

Its operative motions are also rather complex. When the shaft linkage is rotated, the follower bearing, and hence the follower bearing end of the cam linkage, is pulled through the generally elliptical path defined by the cam groove. This follower bearing path, in turn, serves to determine the extension of the follower linkage which engages the tape leader. The full and exact details of this particular pantoarm assembly, as well as the circumvoluted path that it defines for the tape leader are best understood by referring to their detailed drawings; see for example FIGS. 2 and 3 of the -936 patent.

In any event, the forces associated with, and the complexities of, the motions which pantoarms of this type must undergo are such that their mechanisms tend to wear rather quickly. Such wear manifests itself in several ways. Vertical "play" develops. This is chiefly the result of horizontal wear at the pivot points of such pantoarm devices. Horizontal play also develops. This, however, is often more the result of cam groove wear. In all cases however, tape leader alignment and guidance, along the entire path from the supply reel to the take-up reel, soon deteriorates. Ultimately, wear upon such linkages, pivot mechanisms and cam grooves leads to malfunctions. In order to minimize and compensate for such wear, many pantoarm devices employ guides at various places along the path traveled by the leader block. Wear upon these pantoarm components also tends to produce dust and grit which often proves harmful to the entire tape deck system. Data reliability integrity is particularly sensitive to the harmful effects of dust and grit.

SUMMARY OF THE INVENTION

This invention seeks to minimize many of the problems associated with pantoarm tape threader mechanisms. It provides a simple, reliable, long lasting, automatic tape threading device for moving a leader block from a first predetermined position, preferably determined relative to a leader block positioned inside or outside of a supply tape reel, to a second predetermined position, preferably determined relative to some feature of the take-up reel. The tape leader, and hence the tape, travels over a relatively short, generally arcuate path which is at least partially defined by an overhead cam. That is, to say, the camming surface's camming contour edge is located above and parallel to the information transfer surface of the transducer head and above and perpendicular to the top surface of the hub of the take-up reel. A transducer head is located along this generally arcuate path. The threader arm, the take-up reel and/or the supply reel may each have its own motor drive system.

One of the more important features of this threading device is a rotatable, two part, threader arm having only one pivot point. Hence wear is greatly reduced. A first part of the threader arm has torque delivery means such as a motor attached to one end. Its other end is pivotally connected to a second part of the threader arm. The first part may have a straight arm, or a crooked arm, configuration. The crooked arm configuration, hereinafter more fully described, is however preferred. The threader arm may also be provided with "flags" which can be used in conjunction with various light sensor devices known to the art. These light sensor devices may be employed to verify certain select positions of the threader arm. For example they may be used to verify complete attainment of the first predetermined position and/or the second predetermined position.

A tape leader block engaging means such as a threader pin is attached near the far end of the second part of the threader arm; it is located on the underside of, and normal to the plane of, the second part of the threader arm. The threader pin engages with and is guided by the generally arcuate contour edge of the overhead cam. In one highly preferred embodiment of this invention, the second part of the threader arm is further comprised of a leader block carrier piece which includes means to further position the threader pin after it reaches the first predetermined position. Preferably, this means to further position the threader pin is a gear-like mechanism capable of moving the threader pin into complete engagement with the leader block. A preferred mechanism for further positioning the threader pin after it reaches the first predetermined position is more fully disclosed in U.S. patent application Ser. No. 872,951 ("the -951 patent application") and its teachings are hereby incorporated by reference into this patent disclosure. However, the tape threading device disclosed in the present patent application is chiefly concerned with attaining a first predetermined position hereinafter more fully described.

The tape leader engaging means is most preferably a threader pin having an extended cylindrical rod portion which terminates in a larger generally cylindrical enlarged member. This enlarged member, like the one taught in the -936 patent, has a diameter greater than that of the extended cylindrical rod. Enlarged cylindrical members of this type also have a somewhat conical top surface rather than a flat one. Such a conical top surface will later facilitate engagement of the receiver slot in the tape leader block to the enlarged member of our threader pin. Again, this final, complete engagement will take place after the threader pin achieves the first predetermined position with which this patent disclosure is chiefly concerned. We should note in passing however that a conical topped base is preferred because many cassette loading mechanisms engage the threader pin and the receiver in the leader block with a downwardly rotating motion of the tape cassette and its associated leader block. However, for the overall purpose of this patent disclosure our threader pin's base can be thought of as engaging a leader block in the general manner taught by the -660 patent. In both cases, the respective bases can be considered as fully engaged when they are seated in their respective cylindrical receiver holes in the leader blocks.

However, the extended cylindrical rod portion of our threader pin does more than support a cylindrical base. It plays another very important, and altogether different, role. In our device, it is this cylindrical rod portion of the threader pin which actually engages with, and is guided by, the contour edge of our overhead cam. Those skilled in this art will appreciate that our overhead cam could have many different contours; however, in most cases, our camming surface will have a somewhat nonsymmetrical arcuate contour. Naturally, this arcuate contour leads the tape past a transducer head. In one preferred embodiment of the invention the overhead cam leads up to a receiver slot in the outside circumference of the take-up reel. That is to say, this preferred cam is a "partial" overhead cam in that it does not extend over the take-up reel. In a second preferred embodiment of this invention the overhead cam leads substantially to the axis of rotation of the take-up reel. Hence, in this second preferred embodiment, at least a portion of the overhead cam extends over the top of the take-up reel. In another, but less preferred, embodiment of this invention, the overhead cam is presented in the form of a housing whose top surface almost completely covers the take-up reel. In this embodiment, the top of housing is provided with an arcuate slot which serves to guide the rod portion of the threader pin to the axis of rotation of the take-up reel.

Regardless of whether or not the overhead cam is presented in the form of a partial overhead cam or a housing, its contour edge preferably will define an arc-like contour. However it need not be, and preferably is not, perfectly arcuate in contour. For example, near the second predetermined position the contour edge will most preferably be linear rather than arcuate. Linearity in this region will facilitate engaging and disengaging the generally rectangular leader block from the generally rectangular receiver slot in the take-up reel. operations.

The angular measure of these arcuate contours will most preferably be less than about 180 degrees. Angular measures of less than about 150 degrees are even more preferred. However, regardless of its angular measure, the cam's arcuate contour will most preferably guide the threader pin over a major portion of its path between the first predetermined position and the second predetermined position. Again, the first predetermined position is preferably determined relative to an "assumed" position for the tape leader block as it lies in a cassette beyond the first predetermined position. Naturally our first position will also assume that the leader block is properly positioned in the tape cassette, for example as shown in the -660 patent. The second predetermined position will most preferably place the threader pin at a location which approximates, or corresponds to, some point associated with the take-up reel. As previously noted, one preferred predetermined second position is at or near a point on circumference of the take-up reel occupied by a slot for receiving the leader block; another preferred position is at the axis of rotation of the take-up reel.

Final positioning of the threader pin within the take-up reel can be achieved in a number of ways well known to the art. For example, it could be located by a U-shaped slot in the take-up reel such as the slot disclosed in U.S. Pat. No. 4,350,309 (the -309 patent). As noted in the -309 patent, if the length of the tape leader equals the length of the receiver slot in the hub of the take-up reel, then the tape will tend to wind more smoothly around the hub of the take-up reel. Such smooth windings are always desirable in the practice of this art. However, some highly preferred mechanisms for locating a leader block within our take-up reel, in such a manner that noise, vibration and wear due to backlash of the threader arm's motor are reduced, can be found in the teachings of U.S. patent application Ser. No. 872,952 and these teachings are hereby incorporated into this patent disclosure.

DESCRIPTION OF THE PREFERRED EMBODIMENTS

Figure 1:
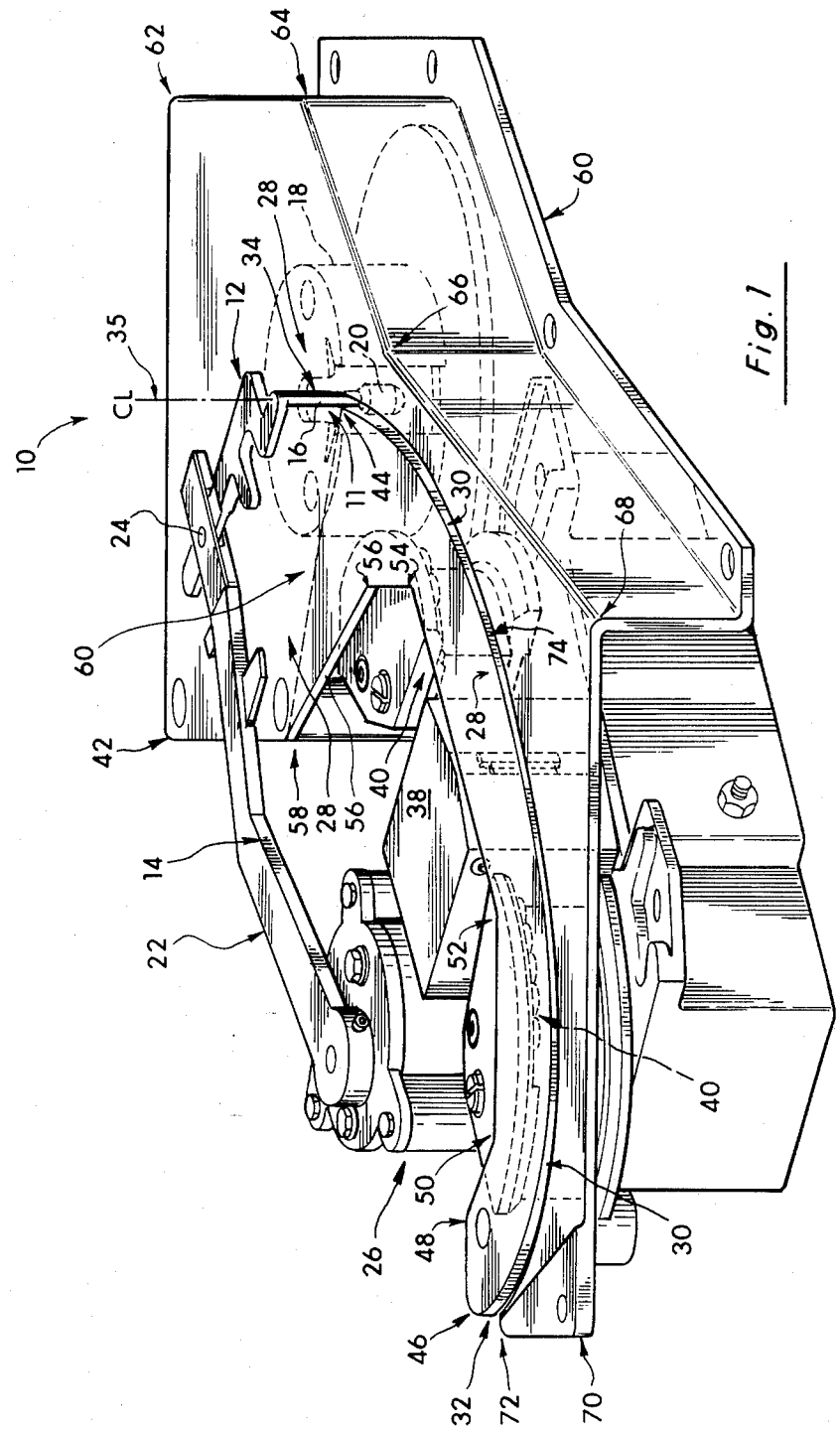
FIG. 1 is a perspective view of various components of our tape threader device shown in assembled relationships.

FIG. 1 shows the tape threading device 10 as a second part 12 (i.e., the leader block carrier) of threader arm 14 is about to position threader pin 16 with respect to take-up reel 18. Threader pin 16 is shown extending well into a slot 11 in take-up reel 18 which is adapted to receive a leader block. The leader block and its associated tape are not shown for reasons of pictorial clarity. A general cylindrical enlarged member or base portion 20 at the end of threader pin 16 would normally engage with a similarly shaped hollow cylindrical receiver in the leader block.

One end of a first part 22 of threader arm 14 is shown attached to torque delivery means 26 such as an electric motor. The second part 12 and first part 22 of the threader arm 14 are connected by pivot means 24 located near the far end of the first part 22 of the threader arm 14; that is to say, pivot means 24 is located near the end of the first part 22 opposite the end to which torque delivery means 26 is attached.

An overhead cam 28 is depicted in the form of a complete housing 60 which completely covers take-up reel 18. However, in a more preferred embodiment of this invention, an overhead cam such as the crescent-shaped one shown in FIG. 5 will be employed. It only will lead up to a point 44 near the outside circumference of take-up reel 18. In other words, in the preferred embodiment, the overhead cam's top surface would end in the region generally indicated along the dotted line shown extending between points 44 and 58. However, regardless of the configuration of the cam's top surface, its contour edge 30 will guide threader pin 16 as threader arm 14 is rotated under the action of torque delivery means 26. The contour edge 30 of overhead cam 28 leads generally from a beginning position 32 to a final position. It should be noted that the beginning position 32 on the cam's contour edge 30 usually will not exactly coincide with the first predetermined position to which the threader pin 16 is delivered. They will differ at least by the distance corresponding to the radius of the threader pin's rod portion. Likewise the final position on the cam's contour edge 30, will approximate, but not coincide with, the second predetermined position to which the threader pin 16 is delivered. Here again they will differ by at least the radius of the threader pin's rod portion. Now having stated the nature of the distinctions between these points, this patent disclosure may, for the sake of simplicity, refer to the beginning position 32 on the cam 28 as if it were synonymous with the threader pin's center line and/or the first predetermined position. Similarly the final position on the cam's contour edge 30 may occasionally be interchanged with the concept of the second predetermined position with respect to the take-up reel 18 to which the threader pin 16 is delivered. Where differentiation between these two points is necessary, the beginning position on the cam will be referred to as beginning position 32 and the first predetermined position will be referred to as 32A. Likewise, final position 44 on the cam's contour edge 30 will be designated as final position 44 and the second predetermined position designated as 44A. Again, this final position on the preferred cam's contour edge 30 will most preferably be in close proximity to the outside circumference of the take-up reel 18; or, in the alternative, at or near some point 34 which lies nominally at the axis of rotation 35 of take-up reel 18.

For the purposes of this patent disclosure, the first predetermined position and the second predetermined position are better considered from reference points other than the cam's contour edge since the path traveled by threader pin 16 and its associated leader block are also defined, at least in part, by the threader arm's length, configuration, angle of rotation, etc. Consequently, another reference point such as the threader pin's cylinder axis constitutes a more preferred reference point for dealing with the concepts of our first predetermined position and our second predetermined position. In all cases however, the path traveled by the threader pin 16 and its associated leader block will, at least in part, be defined by the contour edge 30 of the overhead cam 28.

Contour edge 30, passes just above transducer head 38 in a generally arcuate path. However, the end regions of this path, such as regions 32A and 44A shown in FIG. 3, may be more linear in contour. In this region, the threader pin 16 most preferably will have lost contact with the cam's contour edge 30. Again, this feature will facilitate the engaging and disengaging operations at the take-up reel 18. For example, the linear contour of section 78 shown in FIG. 3, will facilitate entry of threader pin 16 and its associated leader block into the generally elongated linear slot 11 in take-up reel 18. The pivotal relationship between the second part 12 and first part 22 of the threader arm 14 will permit such deviation from a perfectly arcuate path in these regions. In any case, the threader arm's action causes the tape, not shown, to pass just above a transducer head 38 and its associated guides 40. This, of course, is the fundamental purpose of the threader arm mechanism 10. The tape may be aligned with, cooperate and otherwise interact with the transducer head in ways, and by mechanisms, well known to the art.

In one preferred embodiment of this invention, overhead cam 28 has a topside configuration generally defined by points 44, 46, 48, 50, 52, 54, 56 and 58. The camming portions of contour edge 30 lie generally between points 32 and 44. In a less preferred, but still viable embodiment of this invention, the overhead cam 28 is presented in the form of a complete housing 60 whose upper surface is generally defined in FIG. 1 by points 42, 62, 64, 66, 68, 70, 72, 46, 48, 50, 52, 54, 56, and 58. The housing 60 has a slot which generally runs from point 32 to point 34.

Figure 2:
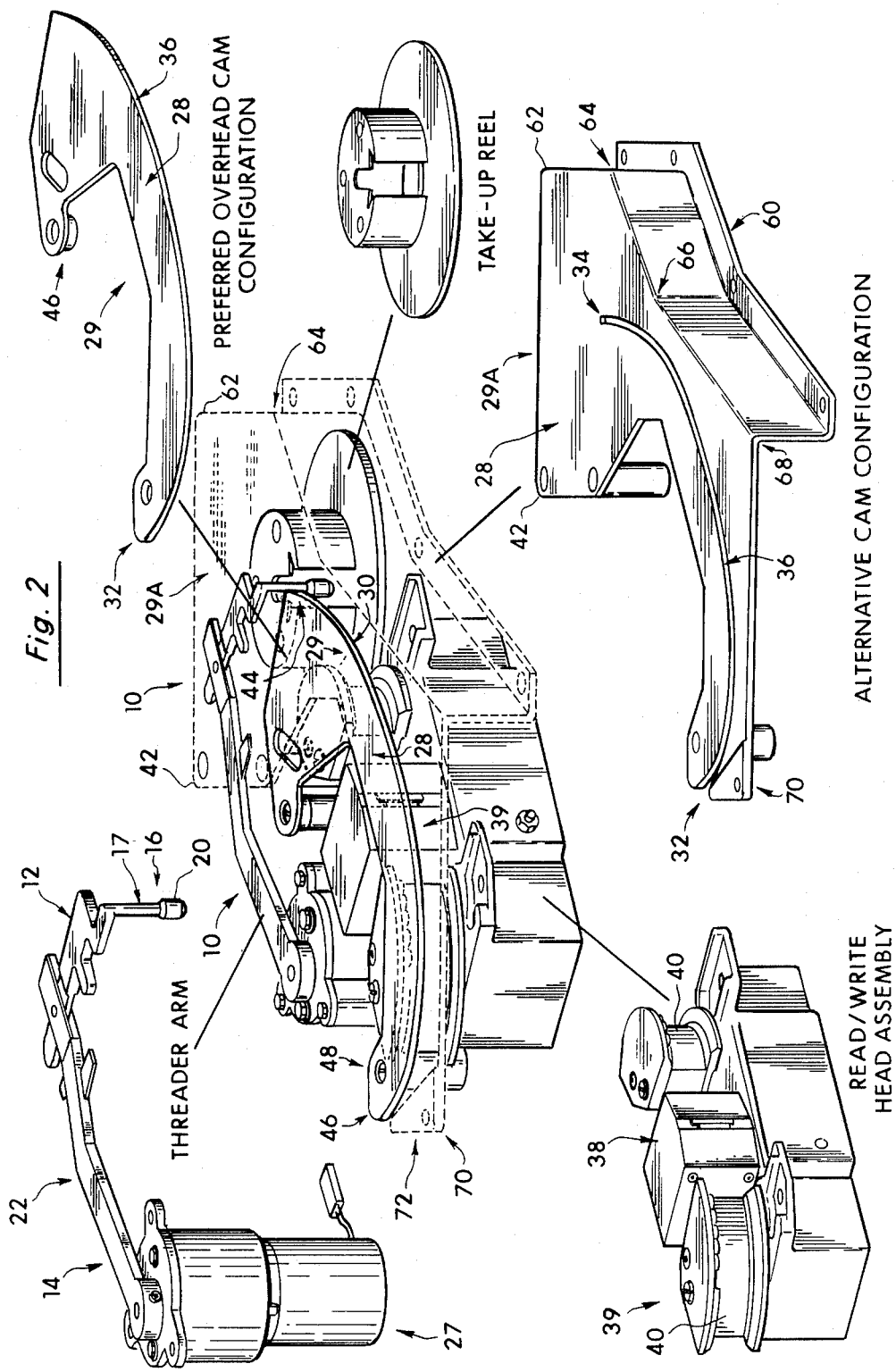
FIG. 2 is a perspective view of the tape threader device showing select components exploded from their assembled relationships. Alternative forms of the overhead cam are depicted.

FIG. 2 depicts an exploded view of certain parts of the tape threading device 10. Threader arm 14 is shown provided with its own motor 27. Those skilled in the art will appreciate that other torque delivery means, e.g., pulleys driven by other motors, could be employed. However, threader arm 14 will most preferably have its own motor 27. Moreover, certain parts of the overhead cam 28 shown in the assembled view of this device are shown in dotted lines (e.g., those shown between points 42 and 62, 62 and 64, 70 and 72 etc.) to indicate a preferred overhead cam 29 having a crescent-shaped or horseshoe-like configuration. Again, this horseshoe-like configuration could be replaced by an overhead cam 28 presented in the form of a complete housing 29A as suggested in FIG. 2. In either case, transducer head 38 is located under camming contour edge 30. The transducer head 38 in FIG. 2 is presented as a part of a transducer head assembly 39 which includes tape guide means 40 well known to the art.

Figure 3:
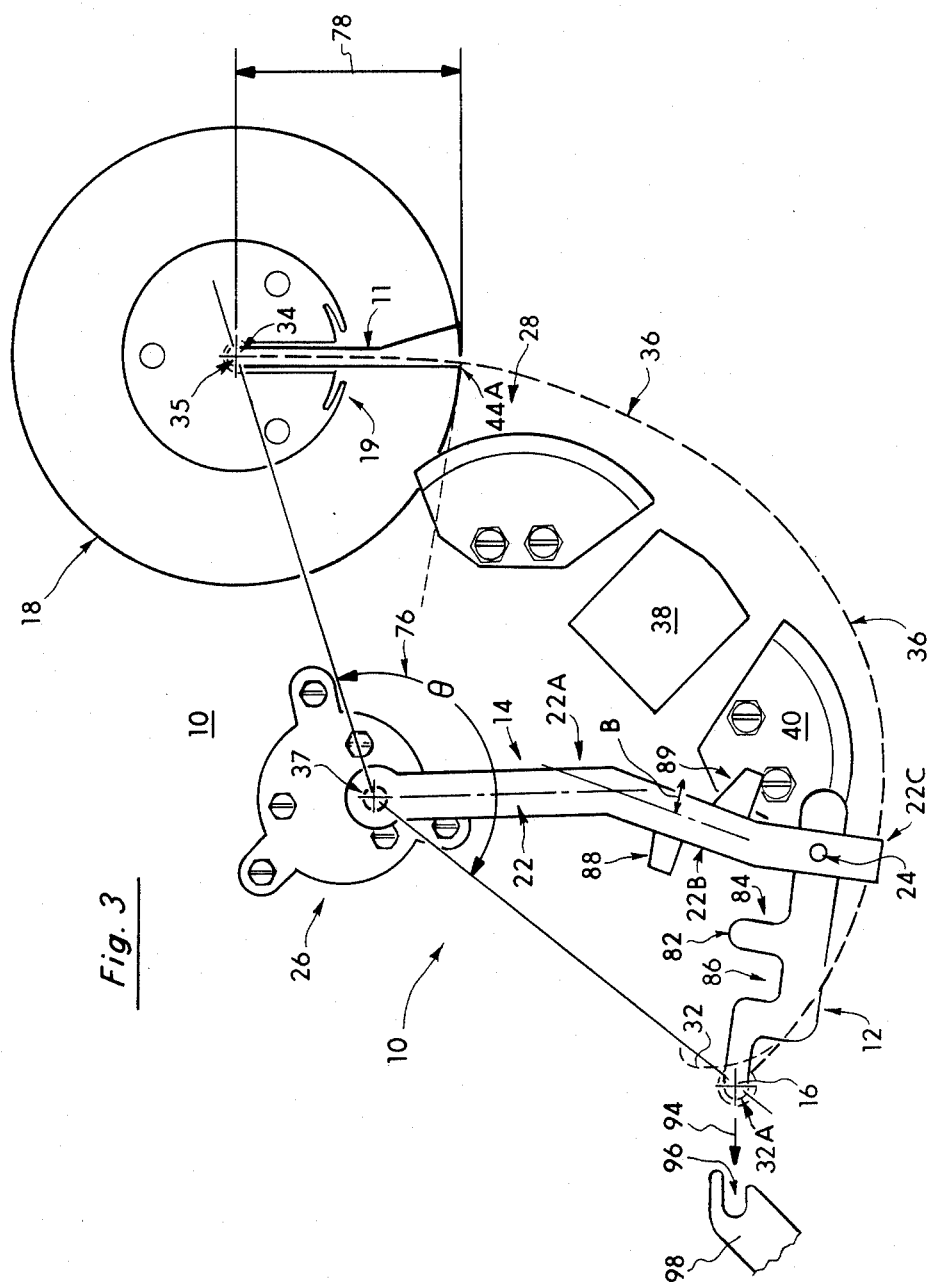
FIG. 3 is a plan view of the threading device.

FIG. 3 shows a plan view of tape threading device 10 with its overhead cam 28 largely removed from consideration. Threader arm 14 is shown as rotatable through an angle theta, under the action of torque delivery means 26. Preferably this angle theta will be less than about 180 degrees; and most preferably it will be less than about 150 degrees. The first part 22 of threader arm 14 is shown in a preferred, "bent" configuration. That is, the first part 22 is comprised of a first element 22A rigidly attached to a second element 22B at an some angle beta as shown. A third element 22C is shown extending from 22B. It lies generally parallel to element 22A. Most preferably angle beta will be less than about 45 degrees. The second part 12 of threader arm is connected to the first part 22 by means of pivot connection 24. This second part 22 is shown provided with gear means 82 which may be employed to move the second part 12 further forward, generally in the direction of arrow 94, after the threader pin 16 arrives at first predetermined position 32A. A beginning position 32 on the cam's contour edge 30 is shown in dotted lines to illustrate a first predetermined position 32A where the threader pin 16 and contour edge 30 are no longer in contact. In any case, this first predetermined position 32A generally serves to position the threader pin 16 for subsequent complete engagement with a generally cylindrical receiver 96 in the front regions of leader block 98. The supply tape cassette with which leader block 98 is associated is not shown. Engagement of the threader pin 16 with receiver 96 of leader block 98 can be accomplished by various known mechanisms. For example, many prior mechanisms use various guides to direct the threader pin 16 with receiver 96 under the action of the motor driven threader arm 14. However, threader pin 16 is preferably positioned in receiver 96 by a gear means which is independent of the operation of threader arm 14. To this end, a gear means 82, such as a tooth 84 and detent 86 system is attached to the second part 12 of threader arm 14. Preferably the gear means 82 will cooperate with a gear mechanism such as that more fully disclosed in U.S. patent application Ser. No. 872,951 whose teachings are hereby incorporated into this patent disclosure.

Figure 4:
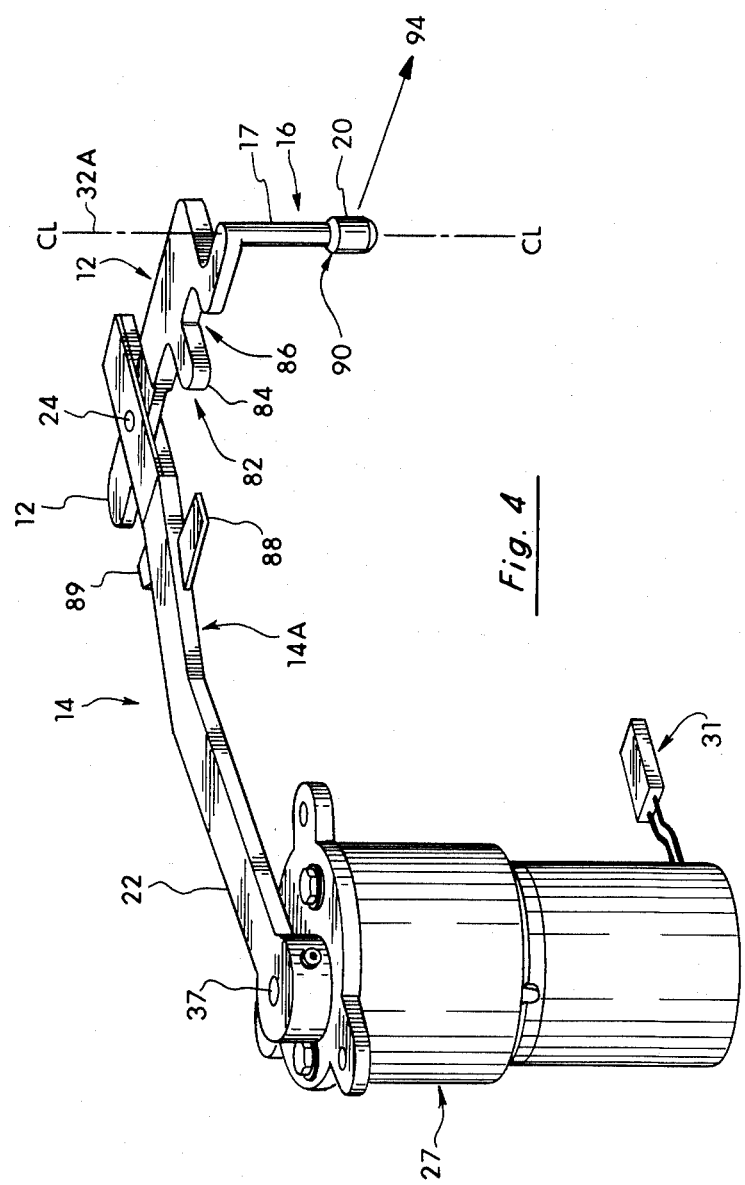
FIG. 4 is an enlarged perspective view of the thread arm assembly.

FIG. 4 shows various features of the threader arm 14. It emphasizes that threader 14 is preferably provided with its own motor 27 whose rotating action is governed by motor control 31 which in turn may interact with various other electrical and mechanical components of the associated tape deck system which are not shown. For example the motor may be programmed to rotate the threader arm through some predetermined angle theta. On the other hand the operation of the motor 27 may be at least partially governed by the action of other devices such as the flags 88 and 89 shown in FIG. 4. Such flags are intended to interact with light sensors which are not shown. In a preferred embodiment of this invention flag 88 is used to verify that the threader arm 22 has arrived at some first predetermined position. Flag 89 may be used to verify that the threader arm 22 has arrived at some second predetermined position. These positions may, in turn, relate to the first and second predetermined position of the threader pin 16 and its associated leader block. Again, gear positioning means 82 will be employed to further move threader 16 in the direction of arrow 94 after it arrives at first predetermined position 32A. Here again, a tooth 84 and detent 86 system is shown to illustrate one means by which the threader pin may be further positioned.

Threader pin 16 is shown provided with an enlarged member 20 having a conical top portion 90. This conical top portion 90 serves as a transition between the extended rod 17 portion and the enlarged member 20 of threader pin 16. This conical top portion will facilitate the final tape-leader/leader pin engaging operations which take place after the threader pin arrives at the first position 34A with which this patent disclosure is chiefly concerned. Again, a preferred mechanism for accomplishing the final engagement of the threader pin and leader block are shown in U.S. patent application Ser. No. 872,951.

Figure 5:
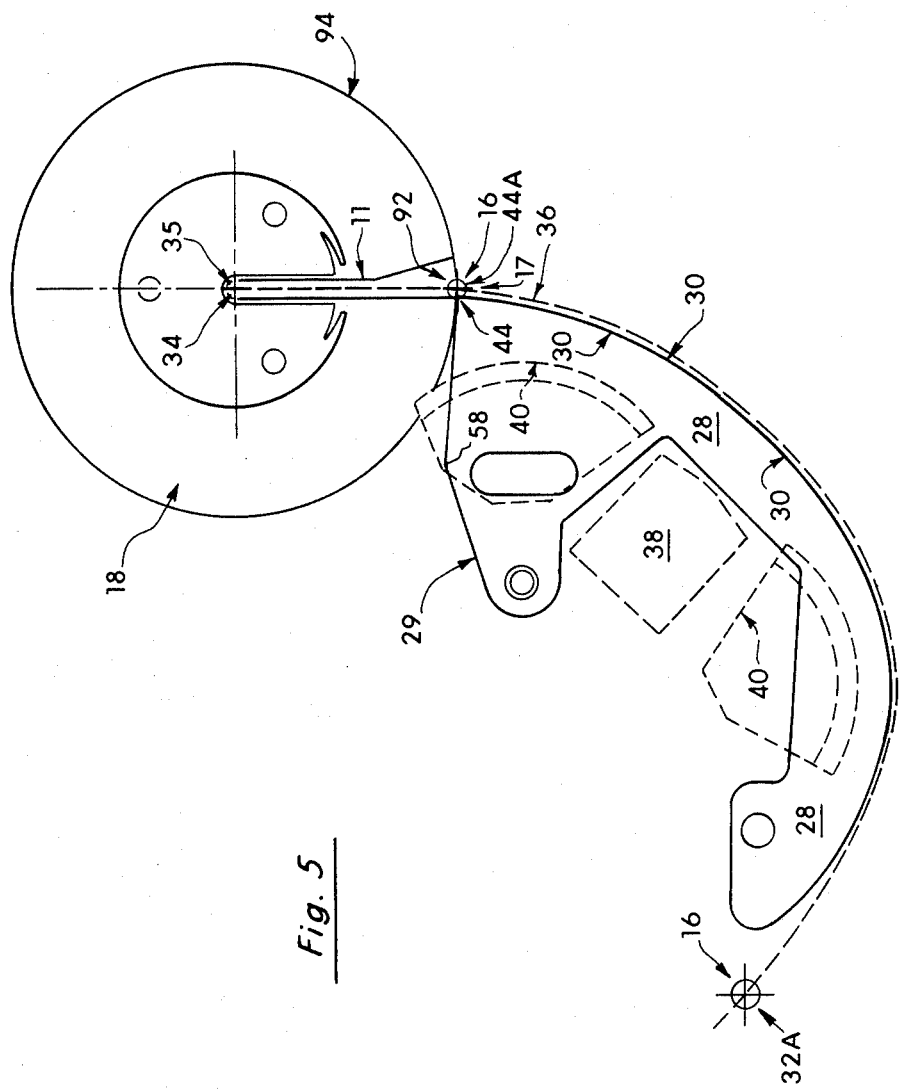
FIG. 5 shows a preferred embodiment of the overhead cams in a preferred second predetermined position.

FIG. 5 shows a plan view of a preferred overhead cam 29. The cam's top surface 28 defines an edge contour 30 which engages a rod portion 17 of threader pin 16 as it moves from a first predetermined position 32A to a second predetermined position 44A. The threader pin's center travels over path 36 as indicated. The second predetermined position 44A is shown adjacent to a final position 44 on the cam's contour edge 30. They are shown separated by a distance which approximates the radius of the rod portion 17 of threader pin 16. This second predetermined position 44A is shown located adjacent to an imaginary point 92 on the circumference of take-up reel 18. Point 92 is imaginary because it lies in the space defined by slot 11 in the take-up reel 18. The function of slot 11 is to receive threader pin 16 and its associated leader block. Ideally, threader pin 16 will be delivered into slot 11 such that the threader pin's center line coincides with the axis of rotation 35 of take-up reel 18.

Figure 6:
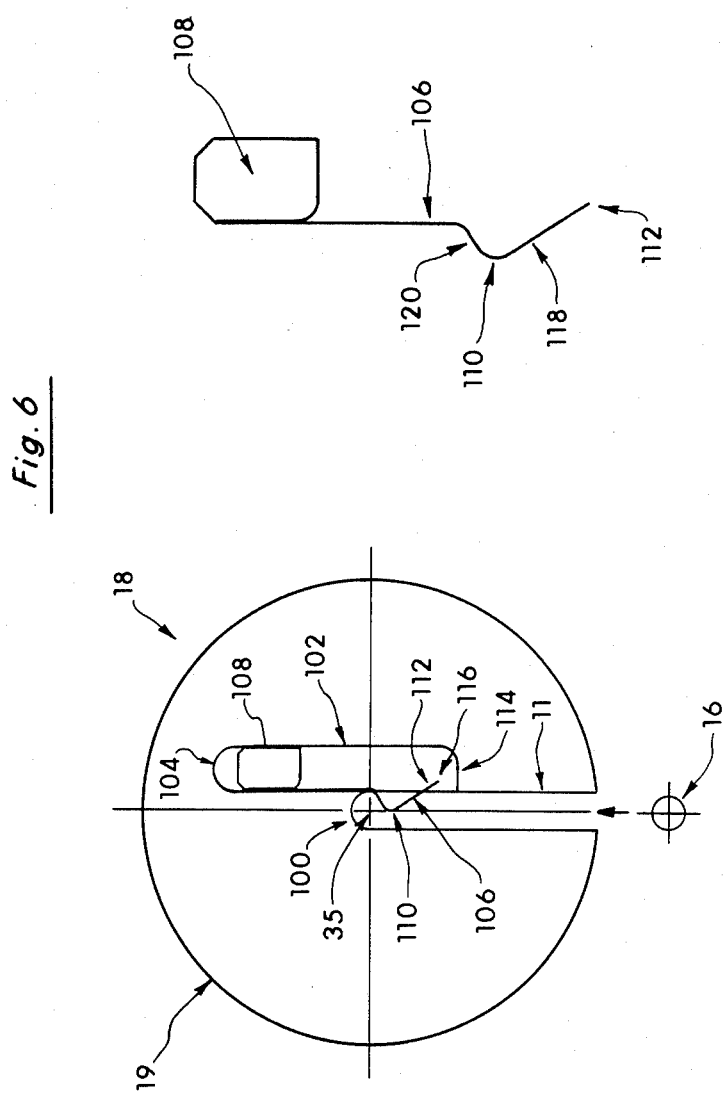
FIG. 6 shows a preferred take-up reel mechanism which may be used in conjunction with our tape threading device.

FIG. 6 shows a partially exploded view of a preferred take-up reel 18 which could be employed in conjunction with this tape threading device. It is more fully described in U.S. patent application Ser. No. 872,951 whose teachings are hereby incorporated into this patent disclosure. In this preferred take-up reel, hub 19 of take-up reel 18 is shown provided with slot 11 for receiving threader pin 16. Slot 11 extends into the hub 19 to an end point 100 located such that there is room for the end portions of the leader block and such that the conical axis of the threader pin will coincide with the axis of rotation 35 of take-up reel 18. A second slot 102 lies adjacent to and parallel to the first slot 11. This second slot 102 extends to an end point 104 which lies well beyond the end point 100 of the first slot 11. The second slot houses a raised leaf spring 106 held in the second slot 102 by a wedging block 108. The raised leaf spring 106 and wedging block 108 are also shown enlarged and exploded away from their assembled positions within the hub 19 to better illustrate the general contour of the raised leaf spring 106. Raised leaf spring 106 is positioned in the second slot 102 such that a raised portion 110 of the raised leaf spring 106 extends into the first slot 11 and partially blocks a region directly in front of the axis of rotation 35 of the take-up reel 18.

As illustrated in FIG. 6, the leading end 112 of raised leaf spring 106 does not completely extend to the end 114 of the second slot 102. An open space 116 is left between the leading end 112 of the leaf spring and the end 114 of the second slot 102. As the incoming threader pin 16 presses against the raised front surface 118 of raised leaf spring 106, the leading end 112 of the raised leaf spring 106 is depressed and driven somewhat forward toward end 114 of the second slot 102. Open space 116 allows for this forward motion. Once the incoming threader pin 16 moves beyond the rear side 120 of raised surface 106, the raised leaf spring 106 returns to its original position and helps to hold threader pin 16 at the axis of rotation 35 of take-up reel 18. The raised leaf spring 106 also serves to prevent threader pin 16 from moving away from the axis of rotation 35 as the threader arm's motor, not shown, quickly stops and starts. That is to say, spring 106 serves to compensate for any "backlash" in the threader arm motor. Such threader arm motor backlash can cause unwanted, noise, vibration and wear upon the threader pin and/or the leader block.

Finally, the threader pin 16 can be withdrawn from slot 11 when the threader arm 14, not shown, forces the threader pin 16 back against the rear side 120 of raised leaf spring 106. Again, the leading end 112 of raised leaf spring 106 is depressed and forced forward to allow threader pin 16 to be withdrawn from slot 11. Thus the threader pin 16 and its associated leader block can be accurately placed into and removed from the slot 11 in take-up reel 18.

While this invention has been described with particularity in connection with a few simple preferred embodiments, other constructions will easily fall within the scope of our invention. For example, these other constructions might include other overhead cam configurations. They might also include guides located upon the rod portion of the threader pins to further facilitate its cooperation with the camming surface. Other mechanical and electrical modifications such as those associated with flag and sensor systems, control and synchronization devices etc., also would fall within the general scope and spirit of this patent disclosure.

Finally, it should also be appreciated that, while the present invention has been described and illustrated in the assumed context of a magnetic tape system, it could also be used in conjunction with other forms of information storage equipment. Such other forms might include optical storage, surface deformation, as well as other known forms of information storage equipment.

Thus having disclosed our invention, we claim:

1. An automatic tape threading device for transferring a tape leader block and its associated tape from a first predetermined position, over a generally arcuate path which passes a transducer head, to a second predetermined position, said threading device comprising:

a rotatable threader arm comprised of two pivotally connected parts, wherein a torque delivery means is attached to one part and a tape leader block engaging means including an enlarged member portion is attached to the other part, said tape leader block engaging means is oriented substantially normal to the plane of the threader arm and extends through the plane of an overhead cam to engage the enlarged member portion with the tape leader block;

an overhead cam located below a plane defined by the rotatable threader arm and having a generally arcuate contour which guides the tape leader block engaging means, at a point on tape leader block engaging means between the rotatable threader arm and the enlarged member portion of the tape leader block engaging means, from the first predetermined position, past the transducer head, to the second predetermined position; and a take up reel having means for coupling with the tape leader block after it reaches the second predetermined position.

2. An automatic, magnetic tape threading device for transferring a tape leader block having a cylindrical receiver for engaging a threader pin, from a first predetermined position determined relative to the cylindrical receiver of the leader block, over a generally arcuate path whose angular measure is less than about 180 degrees and which passes a magnetic read/write head, to a second predetermined position determined relative to a take-up reel, said magnetic tape threading device comprising:

a rotatable threader arm comprised of two pivotally connected parts, wherein a first motor means is attached to one end of a first part and a leader block carrier arm is pivotally mounted to the other end of said first part, said leader block carrier arm further comprises a threader pin having a rod portion and an enlarged member extending normal to the plane of the leader block carrier arm, through the plane of an overhead arcuate cam to engage with a cylindrical receiver of the leader block;

an overhead cam having an overhead arcuate slot whose angular measure is less than about 180 degrees and which guides a rod portion of the threader pin from a first predetermined position, determined with respect to a leader block, to a second predetermined position determined with respect to a slot in the take-up reel which receives the leader block; and a take-up reel driven by a second motor means, said take-up reel having a slot for receiving the leader block so adapted and arranged that the threader pin is located substantially at the axis of rotation of the take-up reel.

3. An automatic magnetic tape threading device for transferring a tape leader block having a cylindrical receiver for engaging a threader pin, from a first predetermined position determined relative to the cylindrical receiver of the leader block, over a generally arcuate path whose angular measure is less than about 180 degrees and which passes a magnetic read/write head, to a second predetermined position determined relative to a take-up reel, said magnetic tape threading device comprising:

a rotatable threader arm comprised of two pivotally connected parts, wherein a first motor means is attached to one end of a first part and a leader block carrier arm is pivotally mounted to the other end of said first part, said leader block carrier arm further comprises (1) a threader pin having a rod portion and an enlarged member extending normal to the plane of the leader block carrier arm, through the plane of an overhead arcuate cam to engage with a cylindrical receiver of the leader block and (2) a gear means for positioning the threader pin after it arrives in the first predetermined position;

an overhead cam having an overhead arcuate camming contour whose angular measure is less than about 180 degrees and which guides a rod portion of the threader pin from a first predetermined position, determined with respect to the leader block, to a second predetermined position determined with respect to the circumferential region of a slot in the take-up reel which receives the leader block; and a take-up reel driven by a second motor means, said take-up reel having a slot for receiving the leader block so adapted and arranged that the threader pin is located substantially at the axis of rotation of the take-up reel.

4. An automatic, magnetic tape threading device for transferring a tape leader block having a cylindrical receiver for engaging a threader pin, from a first predetermined position determined relative to the cylindrical receiver of the leader block, over a generally arcuate path whose angular measure is less than about 180 degrees and which passes a magnetic read/write head, to a second predetermined position determined relative to a take-up reel, said magnetic tape threading device comprising:

a rotatable threader arm comprised of two pivotally connected parts, wherein a first motor means is attached to one end of a first part and a leader block carrier arm is pivotally mounted to the other end of said first part, said leader block carrier arm further comprises (1) a threader pin having a rod portion and an enlarged member extending normal to the plane of the leader block carrier arm, through the plane of an overhead arcuate cam to engage with a cylindrical cut out of the leader block; and (2) a gear means for positioning the threader pin after it arrives in the first predetermined position;

an overhead cam having an overhead arcuate slot whose angular measure is less than about 180 degrees and which guides a rod portion of the threader pin from a first predetermined position, determined with respect to the leader block, to a second predetermined position determined with respect to the axis of rotation of the take-up reel which lies in a slot in the take-up reel which receives the leader block; and a take-up reel driven by a second motor means, said take-up reel having a slot for receiving the leader block so adapted and arranged that the threader pin is located substantially at the axis of rotation of the take-up reel.

5. An automatic, magnetic tape threading device for transferring a tape leader block having a cylindrical receiver for engaging a threader pin, from a first predetermined position determined relative to the cylindrical receiver of the leader block, over a generally arcuate path whose angular measure is less than about 150 degrees and which passes a magnetic read/write head, to a second predetermined position determined relative to a take-up reel, said magnetic tape threading device comprising:

a rotatable threader arm comprised of two pivotally connected parts, wherein a first motor means is attached to one end of a first part and a leader block carrier arm is pivotally mounted to the other end of said first part, said leader block carrier arm further comprises (1) a threader pin having a rod portion and an enlarged member extending normal to the plane of the leader block carrier arm, through the plane of an overhead arcuate cam to engage with a cylindrical receiver of the leader block and (2) a tooth and detent for positioning the threader pin after it arrives in the first predetermined position;

an overhead cam having an overhead arcuate camming contour whose angular measure is less than about 150 degrees and which guides a rod portion of the threader pin from a first predetermined position, determined with respect to the cam's action upon the rod portion of the threader pin and with respect to the leader block, to a second predetermined position determined with respect to the circumferential region of a slot in the take-up reel which receives the leader block; and a take-up reel driven by a second motor means, said take-up reel having a slot for receiving the leader block so adapted and arranged that the threader pin is located substantially at the axis of rotation of the take-up reel.

6. An automatic, magnetic tape threading device for transferring a tape leader block having a cylindrical receiver for engaging a threader pin, from a first predetermined position determined relative to the cylindrical receiver of the leader block, over a generally arcuate path whose angular measure is less than about 150 degrees and which passes a magnetic read/write head, to a second predetermined position determined relative to a take-up reel, said magnetic tape threading device comprising:

a rotatable threader arm comprised of two pivotally connected parts, wherein a first motor means is attached to one end of a first part and a leader block carrier arm is pivotally mounted to the other end of said first part, said leader block carrier arm further comprises (1) a threader pin having a rod portion and an enlarged member extending normal to the plane of the leader block carrier arm, through the plane of an overhead arcuate cam to engage with a cylindrical receiver of the leader block and (2) a tooth and detent for positioning the threader pin after it arrives in the first predetermined position;

an overhead cam having an overhead arcuate camming contour whose angular measure is less than about 150 degrees and which guides a rod portion of the threader pin from a first predetermined position, determined with respect to the cam's action upon the rod portion of the threader pin and with respect to the leader block, to a second predetermined position determined with respect to the axis of rotation of the take-up reel which lies in a slot in the take-up reel which receives the leader block; and a take-up reel driven by a second motor means, said take-up reel having a slot for receiving the leader block so adapted and arranged that the threader pin is located substantially at the axis of rotation of the take-up reel.

* * * * *